United States Patent [19]

Coyne et al.

[11] Patent Number: 4,865,759

[45] Date of Patent: Sep. 12, 1989

[54] DRY PERACID BASED BLEACHING PRODUCT

[75] Inventors: Thomas S. Coyne, Livermore; Daniel H. Klapprott, Brentwood; Eric A. Lutkin, Alameda; Frances E. Mitchell, Pleasanton; Ute H. Riggin, Pleasant Hill; Dale S. Steichen, Livermore; Suzanne M. Thompson, Berkeley, all of Calif.

[73] Assignee: The Clorox Company, Oakland, Calif.

[21] Appl. No.: 273,700

[22] Filed: Nov. 21, 1988

Related U.S. Application Data

[63] Continuation of Ser. No. 767,980, Aug. 21, 1985, abandoned.

[51] Int. Cl.[4] ........................ C11D 3/39; C11D 3/395; D06L 3/02; C01B 15/10

[52] U.S. Cl. .......................... 252/186.42; 252/186.25; 252/186.26; 252/90; 252/95; 252/174.11; 206/524.3; 206/524.4

[58] Field of Search ...................... 252/186.25, 186.26, 252/186.42, 90, 94, 95; 206/205; 428/905

[56] References Cited

U.S. PATENT DOCUMENTS

| | | | |
|---|---|---|---|
| 3,393,153 | 7/1978 | Zimmerer | 252/95 |
| 3,494,787 | 2/1970 | Lund et al. | 252/95 X |
| 3,770,816 | 11/1973 | Nielsen | 252/186.26 X |
| 3,959,163 | 5/1976 | Farley | 252/99 |
| 4,091,544 | 5/1978 | Hutchins | 34/9 |
| 4,094,808 | 6/1978 | Stewart et al. | 252/186 |
| 4,100,095 | 4/1978 | Hutchins et al. | 252/186.26 X |
| 4,126,573 | 11/1978 | Johnston | 252/99 |
| 4,128,495 | 12/1978 | McCrudden | 252/186 |
| 4,145,001 | 3/1979 | Weyenberg et al. | 428/905 X |
| 4,170,453 | 10/1979 | Kitko | 252/186.42 X |
| 4,225,451 | 9/1980 | McCrudden et al. | 252/186.26 X |
| 4,259,201 | 3/1981 | Cockrell et al. | 252/103 |
| 4,337,213 | 6/1982 | Marynowski et al. | 260/502 R |
| 4,339,356 | 7/1982 | Whyte | 252/522 A |
| 4,475,663 | 10/1984 | Kittscher et al. | 206/205 X |
| 4,515,909 | 5/1985 | Sawano et al. | 428/905 X |
| 4,540,721 | 9/1985 | Staller | 523/103 |

FOREIGN PATENT DOCUMENTS

| | | |
|---|---|---|
| 0004463 | 10/1973 | European Pat. Off. . |
| 0002746 | 7/1979 | European Pat. Off. . |
| 0200163 | 11/1986 | European Pat. Off. . |
| 0206417 | 12/1986 | European Pat. Off. . |
| 0206418 | 12/1986 | European Pat. Off. . |
| 2232590 | 1/1975 | France . |
| 1456591 | 11/1976 | United Kingdom . |
| 1456592 | 11/1976 | United Kingdom . |

OTHER PUBLICATIONS

European Search Report, EP 86306442 (published as EP 214 789) (Corresponding to parent U.S. Ser. No. 06/767,980, filed 8/24/85, now abandoned).

European Search Report, EP 86306443 (published as EP 212 976) (Corresponding to U.S. Ser. No. 06/792,344, filed 10/30/85, now abandoned).

S. N. Lewis, "Peracid and Peroxide Oxidations", in: Oxidation (Marcel Dekker, New York 1969), vol. 1, Chapter 5, pp. 213–258.

*Primary Examiner*—Brooks H. Hunt

*Assistant Examiner*—Virginia B. Caress

*Attorney, Agent, or Firm*—Joel J. Hayashida; Michael J. Mazza; Stephen M. Westbrook

[57] ABSTRACT

A dry bleach product is based upon diperacid, particularly diperoxydodecanedioic acid. The dry product comprises separate granular, particulate and beaded components wherein the granular component is diperacid stabilized with an exotherm control agent, diluent and a binder that includes unneutralized polymeric acid. The beaded component is fragrance admixed with a water soluble starch; the particulate components include an agglomerated extender or bulking agent, a pH control agent, and protected fluorescent whitening agents, all as separate particulate components. The water content of the granular diperacid is carefully controlled, as is the ratio of exotherm control agent to diperacid.

18 Claims, No Drawings

DRY PERACID BASED BLEACHING PRODUCT

This is a continuation of application Ser. No. 06/767,980, filed Aug. 21, 1985, now abandoned.

FIELD OF THE INVENTION

This invention relates to household fabric bleaching products, but more particularly to dry bleach products that are based upon stabilized organic disperacid compositions, and especially products based upon the diperacids, diperoxydodecanedioic acid. The dry product includes stabilized diperacid, bulking agents, pH adjusters, fragrance, and fluorescent whitening agents, all packaged as a mixed granular product in a container which is also modified to include a fragrance composition to counteract the normally unpleasant peracid odor.

BACKGROUND OF THE INVENTION

Bleaching compositions have been used in households for at least fifth to seventy-five years as aids in the bleaching and cleaning of fabrics. The liquid bleaches based upon the hypochlorite chemical species have been used most extensively. These hypochlorite bleaches are inexpensive, highly effective, easy to produce, and stable. The advent of modern synthetic dyes and their inclusion in fabrics has introduced a new dimension in bleaching requirements. Modern automatic laundering machines have also changed bleaching techniques and requirements.

The increasing complexity of modern fabrics and laundering equipment has brought forth a need for other types of bleaching compositions. To satisfy this need and to broaden and extend the utility of bleaches for household use, other bleach systems have been introduced in recent years. Prominent among these are dry, powdered on granular compositions, most usually based upon perborate compositions. These bleaching compositions are generally produced in the dry granular or powdered form. In this form they are relatively stable and do not decompose, or decompose very slowly prior to use. To secure the bleaching effect such dry bleaching compositions are dissolved or dispersed into an aqueous environment at which point they rapidly release the bleaching chemical species.

It has been proposed to use dry bleaching compositions based upon peracid chemical species. The peracid chemical compositions include one or more of the chemical functional grouping:

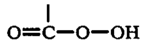

The

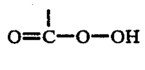

linkage provides a high oxidizing potential; thus leading to the bleaching ability of such compounds.

The organic diperacid compounds are of particular interest since they form solid materials that are capable of providing the oxidizing linkage.

Although the organic peracids are active oxidizing agents and useful in fabric bleaching, they suffer from a number of defects which can seriously interfere with their commercial use. One serious shortcoming is their tendency to undergo exothermal decomposition. Another is their inherently poor shelf stability. And another defect is their odor, which in general is perceived as acrid and obnoxious.

Much effort has been expended to reduce or eliminate the defects of the organic peracid compounds to adapt them to the commercial and, especially, the household market. It has been determined that the tendency to decompose can be eliminated, or greatly reduced by mixing the organic peracids with diluents, or exotherm control agents. U.S. Pat. No. 3,770,816 issued Nov. 6, 1973 to Nielsen, and U.S. Pat. No. 3,494,787 issued Feb. 10, 1970 to Lund et al, discuss the use of hydrated alkali metal or alkaline earth metal salts as a means to control the exothermal deterioration of peracids. U.S. Pat. No. 4,100,095 issued July 11, 1978 to Hutchins et al. suggests the use of acids that liberate water upon heating, e.g., boric acid, as exotherm control agents. This patent however also indicates that the hydrated salts, are to be avoided as exotherm control agents. The patent notes that hydrated salts develop sufficient vapor pressure in the presence of diperacids to cause an increase in the loss of oxygen.

The moisture level in dry peracid products can also affect their shelf-life. Since water facilitates release of active oxygen, careful control of its presence must be maintained in the dry bleach formulation, otherwise premature deterioration of the peracid takes place.

Although the addition of exotherm control agents may effectively alleviate the decomposition problem, a new problem is introduced thereby. As the agents are added to the peracids, the amount of active oxygen released for bleaching is often reduced. Active oxygen is defined to mean the total equivalents of oxidizing moities in the peracid compound. (See S. N. Lewis, "Oxidation", Vol. 1, Chap. 5, R. Augustine, Editor., Marcel Dekker, N.Y., 1969; pp. 213-258) Actual active oxygen release is often less than the stoichiometric or theoretical yield calculated from the active oxygen content of the peracid.

In any event, the addition of exotherm control agents reduces the level of the active oxygen yielded from unstabilized peracids and therefore reduces the efficiency of the peracid composition. This increases the per unit cost, or effectiveness of the stabilized peracid composition. Thus the solution of one problem, raises another problem.

Other problems associated with peracid bleaches stems from their inherent bleaching ability. In this regard, fluorescent whitening agents (FWA's) are desirable components for inclusion in bleaching formulations. They counteract the yellowing of synthetic and cotton fibers. They function by settling out on fabrics during the washing and/or bleaching process, where they absorb ultraviolet light, and then emit visible light, generally, in the blue wavelength ranges. The resulting light emission produces a brightening and whitening effect, thus counteracting any yellowing or dulling of the bleached fabrics.

Unfortunately, however, the FWA's are rather easily oxidized. In the presence of oxidizing agents such as the peracids, they are subject to deterioration and their desired whitening effect is lost. Thus steps must be taken to protect the FWA's from premature oxidation.

The acrid, unpleasant nature of odors released by peracids also presents a continuing problem in securing market acceptance. Some solution to this problem is also necessary.

The present invention solves all of the above and other problems associated with diperacid based bleaching products.

BRIEF DESCRIPTION OF THE INVENTION

The present invention relates to organic diperacid based bleaching products and in particular to organic diperacid bleaching products as prepared for household use. The invention product is a packaged mixed granular dry bleach composition wherein the active component is an organic diperacid, preferably the diperacid, diperoxydodecanedioic acid. Additional components are present in the product to maximize the active oxygen available for bleaching purposes when placed into aqueous solution; to minimize the decomposition of the peracid while on the shelf; and to reduce the objectionable odor of the diperacid.

The improved product is prepared by carefully controlling the ratio of the exotherml control components relative to the diperacid; by adjusting the moisture content of the diperacid component; by mixing protecting components with the FWA; by carefully formulating the fragrance component to protect it from oxidation by the peracid; and by providing a fragrance releasing composition affixed to the interior of the package preferably not in direct contact with the product.

More specifically, the bleaching product is based upon organic diperacids, and preferably upon diperoxydodecanedioic acid. An exotherm control agent, preferably a combination of $Na_2SO_4$ and $MgSO_4$ in the hydrated form, is admixed with the diperacid in critical amounts to optimize the active oxygen yield when the diperacid is used in aqueous environments, but yet affords exotherm protection. The water level present in the diperacid-exotherm control composition of the product is also carefully adjusted so that minimum destabilization of the diperacid is brought about by its presence, but at the same time, the exotherm control effects are maintained. The diperacid and its stabilizing agents are prepared as a distinct granular component of the total composition.

The FWA component of the bleach is separated from the diperacid component by preparing it as a separate granule along with protective agents and bulking agents. Placing the FWA's in a separate environment serves to protect them from degredation, i.e., reaction with the diperacid during the product's shelf-life.

The formulation's fragrance component is stabilized by absorbing it into a starch base and then isolating the mixture as a dry particle prior to admixing into the bleach formulation.

The odor acceptability of the bleach product is also enhanced by affixing a strip or area of fragranced polymeric adhesive, e.g., ethylene/vinyl acetate with fragrance dissolved therein to the interior of the bleach package in the headspace thereof.

It is a principal object of the invention to provide an improved dry diperacid based bleaching product.

It is another object of the invention to provide a diperacid bleach product having maximum active oxygen yield but retaining necessary exotherm control properties.

It is another object of the invention to provide diperacid based bleaching product wherein the moisture content of the bleach and exotherm control agent is regulated to minimize deterioration of the peracid during the product shelf-life but retaining effective exotherm control of the product.

It is still another object of the invention to provide a diperacid bleach product wherein the fragrance component thereof is protected from deterioration during the product's shelf-life.

It is still another object of the invention to provide a diperacid based bleaching product wherein fluorescent whitening agents therein are protected from reaction with the diperacid bleach component during the product's shelf life.

It is yet another object of the invention to provide a fragranced polymer strip adhered to the package interior to counteract objectionable odors from the diperacid bleaching component.

Other objects and advantages of the invention will become apparent from a review of the following description and the claims appended hereto.

DETAILED DESCRIPTION OF THE INVENTION

This invention relates to organic diperacid based bleaching products. The organic diperacids have the general structure:

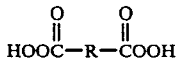

where R is a linear alkyl chain of from 6 to 12 carbon atoms in the chain. These organic diperacids can be synthesized from a number of long chain diacids. U.S. Pat. No. 4,337,213 issued June 29, 1982 to Marynowksi, et al. describes the production of peracids by reacting a selected acid with $H_2O_2$ in the presence of $H_2SO_4$. Such disclosure is incorporated herein by reference.

As noted above the organic diperacids have good oxidizing potential and are aleady known as useful bleaching agents.

Diperoxydodecanedioic acid (hereinafter: DPDDA):

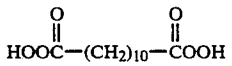

is particularly preferred for use in the present bleaching product. It is relatively stable compared with othr related diperacids and has desirable bleaching characteristics.

Like the other peracids, however, DPDDA is subject to exothermic decomposition. Thus it is necessary to add exotherm control agents to inhibit decomposition. The addition of such agents is known, and in this regard similar exotherm control agents to those previously known are used in the present product. However, in the present product it has been discovered that if the amount of exotherm control agent is carefully controlled, a maximum amount of active oxygen will be released from the DPDDA composition when placed into an aqueous environment.

More specifically, the maximum yield of active oxygen is obtained if the exotherm control agent in the peracid granule, most preferably $MgSO_4$, is maintained in the range of from about 0.15:1 to 0.9:1; but most preferably from about 0.35:1 to 0.75:1 on a weight basis, $MgSO_4$ to DPDDA.

If the exotherm control agent is increased above the critical levels noted above, the yield of active oxygen is reduced to unacceptable levels. If the exotherm control agent is reduced below the critical levels noted, the shelf-life stability of the DPDDA can be greatly impaired.

It is also important that water be present in any admixture of the DPDDA and the exotherm control agent. In fact the presence of water plays an important role in the exotherm control process as it acts to quench any decomposition of the diperacid. It is therefore necessary that the exotherm control agent have waters of hydration to serve as a source of water to stem the decomposition reactions.

It is preferable to include the diperacid bleaching agent as a physically distinct and separate component in the product. Thus the diperacid is prepared as a granular component. This granular component includes a diperacid, the exotherm control agent, the proper amount of water (should be present as waters of hydration), pH control agents, bulking agents, and binders.

It has been found that the water present in the DPDDA granule component should be adjusted to a level of not less than 50% nor more than 70% by weight of exotherm control agent, specifically $MgSO_4$. This level of water corresponds roughly to about $MgSO_4$ with four molecules of water. In the composition this most likely exists as a double salt of $MgSO_4$ and $Na_2SO_4$. At these levels, the diperacid remains stable, however, excess amounts of water interfere with the diperacid stability.

Other components are necessary in the diperacid granules. Sodium sulfate make up the bulk of the diperacid granules. It cooperates with the $MgSO_4$ in retaining the water of hydration, and dilutes the diperacid, serving to isolate it from the other components in the peracid bleach granule.

An organic dicarboxylic acid of any general formula:

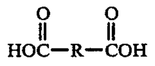

where R equals 1 to 9 carbon atoms, for instance adipic acid, is also desirable in the diperacid granules. It also serves to dilute the diperacid, and aids to adjust the pH of the wash water when the bleach product is used.

The diperacid granule has its physical integrity maintained by the presence of binding agents. Particularly and especially desirable are polymeric acids, such as polyacrylic acid and methyl vinyl ether/maleic anhydride copolymers. Other polymeric acids which may provide this benefit include polyethylene/acrylic acid copolymers. Such materials serve as excellent binders for the granule components and make the granules resistant to dusting and splitting during transportation and handling.

It has been found that DPDDA granules develop an off-odor, reminiscent of rancid butter, when compounded with the dicarboxylic acid, exotherm agent, neutralized polymeric acid binder, and bulking salts. However, unexpectedly if polymeric acid is added in the unneutralized (acid pH) form versus the neturalized form, the development of this unpleasant odor note is eliminated, or greatly reduced. These polymeric acids should therefore have a pH of substantially below 5, more preferably below 3, or most preferably about 2, when prepared as an aqueous solution of approximately 30 wt % polymeric acid.

The DPDDA granules are prepared by first producing a DPDDA wet filter cake, such as by the process of U.S. Pat. No. 4,337,213. Said filter cake is then mixed with the dicarboxylic acid, the exotherm control agents, bulking agents and the binder together to form a doughy mass. The mass is then extruded to form compacted particles. These particles are then partially crushed to form the granules and dried to reduce the moisture content down a level of about 50–70% of the weight of exotherm control agent ($MgSO_4$) present in the granules.

A typical DPDDA granule is: 20 wt. % DPDDA—10 wt. % adipic acid—9 wt. % $MgSO_4$—6% $H_2O$—54 wt. % $Na_2SO_4$—1 wt. % polyacrylic acid (unneutralized).

Fluorescent whitening agents (FWA's) are desirable components for inclusion in bleaching formulations. They counteract the yellowing of cotton and synthetic fibers. They function by adsorbing on fabrics during the washing and/or bleaching process, after which they absorb ultraviolet light, and then emit visible light, generally in the blue wavelength ranges. The resulting light emission produces a brightening and whitening effect, thus counteracting any yellowing or dulling of the bleached fabrics. Such FWA's are standard products and are available from several sources, e.g. Ciba Geigy Corp. of Basle, Switzerland under the tradename 'Tinopol'. Other similar FWA's are disclosed in U.S. Pat. No. 3,393,153 issued to Zimmerer et al., which disclosure is incorporated herein by reference.

Since the diperacid bleaching component of the product is an aggressive oxidizing material, it is important to isolate the FWA component from the diperacid as much as possible. As noted before the diperacid is dispersed within granules wherein it comprises perhaps 20 wt. % thereof. Similarly it is advantageous to disperse the FWA's within particles separate from the diperacid granules. For this purpose, the FWA may be admixed with an alkaline material that is compatible therewith and which further serves to protect the FWA from the oxidizing action of the DPDDA content of the product. Thus the FWA may be admixed with an alkaline diluent such as $NA_2CO_3$, silicates, etc.

The FWA is mixed with the alkaline diluent, a binding agent and, optionally a bulking agent, e.g., $Na_2SO_4$, and a colorant. The mixture is then compacted to form particles. These particles are then admixed into the bleach product. The FWA particles may comprise a small percentage of the total weight of the bleach product, perhaps 0.5 to 10 wt. % thereof.

In any event, the FWA is present in a particle form wherein it is admixed with an alkaline diluent material. Thus the FWA is protected from the oxidizing action of the diperacid prior to actual use of the bleach product.

A fragrance to impart a pleasant odor to the bleaching solution containing the diperacid product is also included. These fragrances are subject to oxidation by the diperacid. It is known to protect fragrances from oxidizing environments by encapsulating them in polymeric materials such as polyvinyl alcohol. Quite surprisingly, it has been determined that absorbing fragrance oils into starch or sugar also protects them from oxidation and affords their ready release when placed into an aqueous environment. Therefore the fragrance, which is secured in the form of fragrance oils, is preferably absorbed into inert materials, such as starches, or sugars, or mixtures of starches and sugars. The absorbed fragrance and starch or sugar base is then formed into beads, wherein the fragrance is imprisoned. Thus the fragrance is added to the bleach product in the form of beads. The fragrance beads are soluble in water. Therefore although the fragrance is protected from attack by the diperacid when the product is in the dry state, i.e., on the shelf, the fragrance is released into the bleach/wash water when the product is used. The fragrance beads are preferred in the products in amounts of perhaps 0.1–2.0 wt. %.

Other buffering and/or bulking agents are also utilized in the bleaching product. Boric acid and/or sodium borate are preferred for inclusion to adjust the product's pH. The use of boric acid as a pH control agent is noted in British patent 1456591 published Nov. 24, 1976. Bulking agents, e.g., $Na_2SO_4$, or binders and extenders are also included. The most preferred such agent is sodium sulfate. Such buffer and builder/extender agents are included in the product in particulate form so that the entire composition forms of free-flowing dry product. The buffer may comprise in the neighborhood of 5 to 90 wt. % of the bleach product; while the builder/extender may comprise in the neighborhood of from 10 to about 90 wt. % of the bleach product.

In order to maintain the product as a free flowing product and reduce dusting, it is advantageous to agglomerate the buffers/builders/extenders with a binder. Suitable binders for such purpose are polymeric acids, which were also referred to above as binders for the diperacid granules.

Some typical formulations for the bleach compositions of the invention are as follows:

EXAMPLE 1

| | | |
|---|---|---|
| DPDDA Granules | 37.62[A] | wt. % |
| pH control particles (Boric Acid) | 16.9[B] | |
| FWA Particles | 4.2[C] | |
| Fragrance Beads | 0.66 | |
| Bulking Agent ($Na_2SO_4$) | 40.62[D] | |

EXAMPLE 2

| | | |
|---|---|---|
| DPDDA Granules | 18.8[A] | wt. % |
| pH control particles (Boric Acid) | 23.0[B] | |
| FWA Particles | 4.0[C] | |
| Fragrance Beads | 1.0 | |
| Bulking Agent ($Na_2SO_4$) | 53.2[D] | |

[A] DPDDA granules were 20 wt. % DPDDA, 10 wt. % adipic acid, 1 wt. % unneutralized polyacrylic acid binder, 9 wt. % $MgSO_4$, 55 wt. % $Na_2SO_4$. Water content reduced to assure that $H_2O$ was present at 50–70% of weight of $MgSO_4$, e.g., $H_2O$ about 60% of $MgSO_4$ weight.

[B] pH control agent agglomerated with about 1% polyacrylic acid.

[C] FWA particles were 32 wt. % 5-BMXC (FWA from CIBA-GEIGY); 33 wt. % $Na_2CO_3$; 8 wt. % ultramarine blue; 2.5 wt. % Alcosperse 157A; 5.8 wt. % $H_2O$; $Na_2SO_4$ remainder.

[D] Bulking agent agglomerated with 1.5 wt. % polyacrylic acid.

The above formulations are only illustrative. Other formulations are contemplated, so long as they fall within the guidelines for the diperacid bleach product.

Although the inclusion of unneutralized polyacrylic acid as a binder for the DPDDA granules reduces or eliminates off or rancid odors, the DPDDA itself generates an unpleasant acrid odor. This odor is unpleasant to most individuals and its presence reduces the acceptability of the bleaching product. The fragrance beads present in the product do not overcome this problem. Most of the fragrance is locked in the beads and is not released until the product is placed into an aqueous environment. Therefore additional steps are necessary to overcome this problem. In this invention, a second source of fragrance is provided to counteract the normal unpleasant odor of the DPDDA.

Specifically, a small adherent strip (perhaps 3 square inches in area) of fragranced material is affixed to the inside of the bleach package at a location normally separated from the bleach formulation. This fragranced strip ideally is adhered to an inside upper flap of the bleach package. In such position, the fragranced strip is effectively removed from constant direct contact with the oxidizing component of the bleach composition and undesired oxidation of the admixed fragrance oil is avoided, or at least greatly reduced. Additionally, the use of a polymeric matrix material also affords protection of the entrapped fragrance from oxidation. Thus the fragranced strip comprises an amorphous, hydrophobic, self-adhering polymeric material into which fragrance has been intimately dispersed.

On the other hand, the fragrance does slowly volatilize and permeate the air space within the bleach package to thereby counteract the undesirable odor emanating from the diperacid.

More specifically, the desired fragrance is dissolved in a matrix material, while the matrix material is at an elevated temperature, e.g., 150–300° F. At such temperature the matrix melts and the fragrance oil is readily admixed therein. Suitable matrix materials are ethylene/ethyl acrylate blends, polyethylene/polypropylene blends, polyamides, polyesters, and ethylene/vinyl acetate copolymers. Ethylene/vinyl acetate copolymers are preferred. Any such matrix material is selected for its ability to melt below a temperature above which a significant portion of the fragrance is volatilized. And for its ability to strongly adhere to the packaging material surface, e.g., laminated cartonboard, particle board, plastics, non-woven fabrics, etc., when solidified at room temperatures.

The fragranced material is applied to the desired portion of the package interior as a hot melt. Upon cooling the fragranced material strongly adheres to the package interior, where it slowly releases its fragrance to counteract the objectionable odor of the diperacid.

A typical hot melt fragranced composition may contain from about 10 to 60 wt. % of the fragrance oil and about 10 to 75% vinyl acetate in the ethylene/vinyl acetate copolymer adhesive base. Such fragrance-adhesive mixture should have an equivalent hot melt index of from 1–50,000; and a hot melt ring and ball softening point of from 150–300° F. About 0.5–10 grams of fragranced adhesive are applied in a strip to the package interior.

By such means, the diperacid odors are effectively counteracted upon opening and when using the diperacid bleach product.

The diperacid based bleaching product as described hereinabove provides an effective bleaching material when poured into water at which time active oxygen is released. The fragrance beads also dissolve at that time to release their fragrance and counteracted any adverse odors released by the diperacid during the bleaching and/or washing cycle.

The following tests further illustrate the above disclosure.

TEST 1

To ascertain the effect of neutralized and unneutralized polymeric acid, two batches of DPDDA granules were made by the process discussed above. The granules comprised 20 wt. % DPDDA, 9 wt. % $MgSO_4$, 1 wt. % of a polymeric acid, 6 wt. % $H_2O$, 10 wt. % adipic acid, and 54 wt. % $Na_2SO_4$. In one batch, the polymeric acid solution (manufactured by the Alco Co. of Chattanooga, Tennessee and sold under the trademark Alcosperse 157A) was neutralized to pH 5. In the companion batch, the polymer was neutralized. This polymer had a pH of about 2.

An expert olfactory judge found the rancid odor to be significantly higher in the granules containing the neutralized polymeric acid as contrasted to the granules containing the unneutralized polymeric acid.

TEST 2

A test was run to determine the effect the water level in diperacid granules has upon storage stability. Two batches of DPDDA granules were made in accordance with the process disclosed above.

| | Batch 1 | Batch 2 |
|---|---|---|
| DPDDA | 20 wt. % | 20 wt. % |
| $MgSO_4$ | 9 | 9 |
| Bindng agent | 1 | 1 |
| Adipic acid | 10 | 10 |
| $H_2O$ | 6.2 | 10.8 |
| $Na_2SO_4$ | remainder | remainder |

The respective granules were then admixed to give compositions similar to that shown in Example 1 above. The respective compositions were then stored at 100° F. for periods of 2 and 4 weeks at which time the loss of DPDDA was determined.

The results were as follows:

| | Percent DPDDA Lost | |
|---|---|---|
| | Batch 1 | Batch 2 |
| 2 weeks storage | 15.6 | 30.2 |
| 4 weeks storage | 23.3 | 65.4 |

The results show that adjusting the water to a level of 50–70% by weight of $MgSO_4$ substantially increased the stability of the DPDDA.

TEST 3

A further test was conducted to ascertain the effect the exotherm control agent has upon active oxygen released during the wash/bleach process.

Three batches of DPDDA were prepared as granules in accordance with the process disclosed above. Their compositions were:

| | Batch 1 | Batch 2 | Batch 3 |
|---|---|---|---|
| DPDDA | 20 wt. % | 20 wt. % | 20 wt. % |
| $MgSO_4$ | 9 | 15 | 22 |
| Bindng agent | 1 | 1 | 1 |
| Adipic acid | 10 | 10 | 10 |
| Water | 50–70% by weight of $MgSO_4$ | | |
| $Na_2SO_4$ | remainder | remainder | remainder |

Equal portions of each respective batch was then placed into wash water under identical washing conditions and the total amount of active oxygen released was measured. The results were as follows:

| | Batch 1 | Batch 2 | Batch 3 |
|---|---|---|---|
| % of active oxygen released | 96.8 | 100 | 81.3* |

*significant at 95% confidence.

The results illustrate that when the ratio of $MgSO_4$ to DPDDA increases to a level greater than about 1:1, then the release of active oxygen substantially decreases. This demonstrates that the ratio of $MgSO_4$ to DPDDA is critical.

TEST 4

The fragrance beads were tested for stability when in the presence of DPDDA. Fragrance beads prepared as noted above, i.e., in starch beads were included in a DPDDA containing composition at a level of 0.50 wt. %. After 8 weeks storage at 100° F., the fragrance containing composition was used in a simulated washing situation and the level of fragrance released was evaluated by an experienced fragrance judge. The level of fragrance was judged to be acceptable. While the fragrance beads were demonstrated to be effective for these peracid formulations, in fact such technique is also applicable to other oxidant bleaches which may impart unpleasant odors in aqueous solution, such as perborate and activator systems, or even dry chlorine bleaches, such as dichloroisocyanurate.

TEST 5

A floral type fragrance was mixed with an ethylene/-vinyl acetate resin in accordance with process discussed above. A strip containing the fragrance was formed. The same fragrance was also adsorbed onto a cellulose pad. The strip and pad containing the fragrance were suspended above peracid containing composition in closed containers. After 4 weeks storage at 100° F., the fragrance in the strip was judged by a fragrance expert to be superior to the cellulose pad. The fragrance containing ethylene/vinyl acetate strip exhibited superior fragrance release and stability.

While the fragrance strip is effective for peracid bleach packaging, in fact this technique is also applicable to packages for other oxidant bleaches which may evolve unpleasant odor within the package, such as perborate and activator systems, e.g., tetraacetyl ethylene diamine.

TEST 6

A test was undertaken to determine the effect of FWA particle composition upon its storage stability in the presence of diperacid. Two batches of FWA particles were made in accordance with the process disclosed above. The respective FWA batch particles were then admixed with diperacid and other components to give formulations similar to that shown in Example 1 above. The composition of the two batches were:

| | Batch 1 | Batch 2 |
|---|---|---|
| FWA | 32 wt. % | 32 wt. % |
| $Na_2CO_3$ | 33 | — |
| Binding agent | 8.3 | 8.3 |
| Ultramarine blue | 8 | 8 |

-continued

| | Batch 1 | Batch 2 |
|---|---|---|
| $Na_2SO_4$ | 18.7 | 51.7 |

These formulations with their respective FWA particles were then stored at 120° F. for a period of 4 weeks, at which time the loss of FWA was determined. As a control, FWA as received from the supplier was admixed with the bleach composition and also tested along with the formulated FWA's.

The results were as follows:

| | Storage at 120° F. for 4 weeks | | |
|---|---|---|---|
| | Batch 1 | Batch 2 | FWA Control |
| Percent FWA lost | 20.4 | 41.7 | 50.5 |

The results show that addition of the alkaline agent substantially increased the stability of the FWA. The FWA stability was also enhanced by the process of particle formation, whereby intimate contact with the oxidant was eliminated.

What is claimed is:

1. A bleaching product comprising an enclosure of packaging material defining an interior volume, a diperacid based bleaching formulation filing at least a portion of said interior volume, said bleaching product comprising a plurality of (a) granules, (b) beads, and (c) agglomerated particles; wherein said granules of (a) comprise a diperacid bleach component, a pH control agent, a dilution agent, a binder, an exotherm control agent consisting of a hydratable inorganic salt present in the range of from about 0.15:1 to about 0.9:1 by weight of the diperacid bleach component, and water present in an amount of not less than 50% and more than 70%, by weight of the exotherm control agent; wherein at least a first portion of said agglomerated particles of (c) comprise a pH adjusting agent, a second portion of said agglomerated particles of (c) is an extender, and a third portion of said agglomerated particles of (c) comprise fluorescent whitening agent admixed with an alkaline agent; wherein said beads of (b) comprise fragrance oil mixed with a water soluble carrier; and a fragrance strip comprising an amorphous, hydrophobic, self-adhering polymeric material into which a fragrance has been intimately dispersed, said fragrance strip applied as a hot melt to the interior of said enclosure in a location separated from said bleaching formulation.

2. The bleaching product of claim 1 wherein the diperacid bleach component is diperoxydodecanedioic acid.

3. The bleaching product of claim 1 wherein the exotherm control agent is $MgSO_4$.

4. The bleaching product of claim 1 wherein the binder in said diperacid granules is unneutralized polymer acid.

5. The bleaching product of claim 1 wherein the dilution agent and extender is sodium sulfate.

6. The bleaching product of claim 1 wherein the pH adjusting agent is boric acid or sodium borate.

7. The bleaching product of claim 1 wherein said fragrance bead carrier is starch or sugars.

8. The bleaching product of claim 1 wherein the fragrance strip polymeric material is ethylene/vinyl acetate polymer.

9. The bleaching product of claim 1 wherein the alkaline agent in said third portion is sodium carbonate.

10. The bleaching product of claim 1 wherein said polymeric material has a hot melt ring and ball softening point of from 150 −300° F.

11. The bleaching product of claim 10 wherein said polymeric material is an ethylene-vinyl acetate copolymer.

12. A package and an oxidant based bleaching composition contained therein, said package including a fragrance strip applied as a hot melt to the interior of said package at a location separated from said oxidant bleaching composition, said fragrance strip comprising an amorphous, hydrophobic, self-adhering polymeric material into which a fragrance has been intimately dispersed.

13. The fragrance strip of claim 12 wherein the polymeric adhesive is ethylene/vinyl acetate.

14. The package of claim 12 wherein said polymeric material has a hot melt ring and ball softening point of from 150–300° F.

15. The package of claim 14 wherein said polymeric material is an ethylene-vinyl acetate copolymer.

16. A package and a dry peracid based bleaching product enclosed therein, said package containing there within a headspace, said headspace defined as the volume of the interior of the package which is unfilled by said bleaching product, the headspace of said package being fragranced by a self-adhering fragrance strip applied as a hot melt to the interior of said package above said bleaching product.

17. The package of claim 16 wherein said fragrance strip is made of a polymeric material having a hot melt ring and ball softening point of from 150–300° F.

18. The package of claim 17 wherein said polymeric material is ethylene-vinyl acetate copolymer.

* * * * *